(12) United States Patent
Liu et al.

(10) Patent No.: US 9,920,209 B2
(45) Date of Patent: Mar. 20, 2018

(54) AQUEOUS INKJET INK COMPOSITIONS

(71) Applicant: Cabot Corporation, Boston, MA (US)

(72) Inventors: Tianqi Liu, Boxborough, MA (US); Barbara E. Brys, Bedford, MA (US)

(73) Assignee: Cabot Corporation, Boston, MA (US)

( * ) Notice: Subject to any disclaimer, the term of this patent is extended or adjusted under 35 U.S.C. 154(b) by 0 days.

(21) Appl. No.: 14/881,913

(22) Filed: Oct. 13, 2015

(65) Prior Publication Data

US 2016/0102218 A1 Apr. 14, 2016

Related U.S. Application Data

(60) Provisional application No. 62/063,732, filed on Oct. 14, 2014.

(51) Int. Cl.
*C09D 11/322* (2014.01)
*C09D 11/102* (2014.01)
*C09D 11/38* (2014.01)

(52) U.S. Cl.
CPC ............ *C09D 11/38* (2013.01); *C09D 11/102* (2013.01); *C09D 11/322* (2013.01)

(58) Field of Classification Search
CPC ...... C09D 11/102; C09D 11/322; C09D 11/38
USPC ............................. 106/31.86, 31.89; 347/100
See application file for complete search history.

(56) References Cited

U.S. PATENT DOCUMENTS

| | | | |
|---|---|---|---|
| 5,948,155 A | 9/1999 | Yui et al. | |
| 6,187,086 B1 | 2/2001 | Rehman | |
| 6,300,391 B2 | 10/2001 | Parazak et al. | |
| 7,622,513 B2 | 11/2009 | Sarkisian et al. | |
| 7,655,707 B2 | 2/2010 | Ma | |
| 7,677,714 B2 | 3/2010 | Sarkisian et al. | |
| 7,678,844 B2 | 3/2010 | Rehman et al. | |
| 8,430,475 B2 | 4/2013 | Kabalnov et al. | |
| 8,492,457 B2 | 7/2013 | Palumbo | |
| 8,668,966 B2 | 3/2014 | Kasperchik et al. | |
| 8,789,936 B2 | 7/2014 | Mubarekyan | |
| 2002/0075369 A1* | 6/2002 | Ota ....................... | C09D 11/322 347/100 |
| 2004/0252169 A1* | 12/2004 | Chen ..................... | C09D 11/322 347/96 |
| 2007/0100024 A1 | 5/2007 | Gu et al. | |
| 2007/0225400 A1* | 9/2007 | Schmid ................. | C09D 11/30 523/160 |
| 2008/0229972 A1* | 9/2008 | Blease .................. | C09D 11/38 106/31.27 |
| 2012/0218359 A1* | 8/2012 | Roberts ................ | C09D 11/322 347/100 |
| 2012/0236066 A1 | 9/2012 | Tamai et al. | |
| 2012/0249661 A1* | 10/2012 | Tyrell ..................... | C09D 11/38 347/20 |
| 2013/0286081 A1 | 10/2013 | Sarkisian et al. | |
| 2013/0337237 A1* | 12/2013 | Wu ....................... | C09D 11/102 428/195.1 |
| 2014/0220322 A1* | 8/2014 | Wu ....................... | C09D 11/102 428/211.1 |
| 2014/0247312 A1* | 9/2014 | Prasad ................. | C09D 11/322 347/87 |
| 2014/0251179 A1* | 9/2014 | Liu ....................... | C09D 11/324 106/31.86 |
| 2014/0300673 A1* | 10/2014 | Prasad .................. | C09D 11/38 347/100 |
| 2015/0299486 A1* | 10/2015 | Ootsuka ................ | C09D 11/38 347/20 |
| 2015/0299487 A1* | 10/2015 | Taya .................... | C09D 11/322 347/20 |
| 2016/0222237 A1* | 8/2016 | Liu ....................... | C09D 11/322 |

FOREIGN PATENT DOCUMENTS

| | | |
|---|---|---|
| EP | 2 937 389 A1 | 10/2015 |
| EP | 2 937 390 A1 | 10/2015 |
| WO | WO 2011/078842 A1 | 6/2011 |
| WO | WO 2011/159370 A1 | 12/2011 |

OTHER PUBLICATIONS

Notification of Transmittal of the International Search Report and the Written Opinion of the International Searching Authority, or the Declaration for International Application No. PCT/US2015/055308, mailed from European Patent Office dated Nov. 26, 2015.

* cited by examiner

*Primary Examiner* — Helene Klemanski

(57) ABSTRACT

Disclosed herein are aqueous inkjet ink compositions and coating compositions comprising: at least one pigment; at least one polymer; and at least one water-soluble compound having a hydroxyl number of at least 40, wherein the at least one water-soluble compound is selected from ethoxylated $C_3$-$C_{20}$ polyols, $C_4$-$C_{20}$ polyols having three or more hydroxyl groups, and polyether polyols, and wherein the at least one water-soluble compound is present in an amount ranging from 1% to by 60% weight, relative to the total weight of the composition, wherein the composition comprises a total amount of water-soluble organic components ranging from 25% to 60% by weight, relative to the total weight of the composition.

24 Claims, No Drawings

AQUEOUS INKJET INK COMPOSITIONS

RELATED APPLICATION

This application claims priority to U.S. Provisional Application No. 62/063,732, filed Oct. 14, 2014, the disclosure of which is incorporated herein by reference.

FIELD OF THE INVENTION

Disclosed herein are inkjet ink compositions providing beneficial printing performance, such as one or more of improved mottle, drying times, and/or strikethrough.

SUMMARY

One embodiment provides an aqueous inkjet ink composition, or a coating composition, comprising, consisting essentially of, or consisting of:
  at least one pigment;
  at least one polymer; and
  at least one water-soluble compound having a hydroxyl number of at least 40, wherein the at least one water-soluble compound is selected from ethoxylated $C_3$-$C_{20}$ polyols, $C_4$-$C_{20}$ polyols having three or more hydroxyl groups, and polyether polyols, and wherein the at least one water-soluble compound is present in an amount ranging from 1% to by 60% weight, relative to the total weight of the composition,
  wherein the composition comprises a total amount of water-soluble organic components ranging from 25% to 60% by weight, relative to the total weight of the composition.

Another embodiment provides a method of inkjet ink printing, comprising:
  depositing onto a coated inkjet paper an aqueous inkjet ink composition comprising:
    at least one pigment;
    at least one polymer; and
    at least one water-soluble compound having a hydroxyl number of at least 40, wherein the at least one water-soluble compound is selected from ethoxylated $C_3$-$C_{20}$ polyols, $C_4$-$C_{20}$ polyols having three or more hydroxyl groups, and polyether polyols, and wherein the at least one water-soluble compound is present in an amount ranging from 1% to by 60% weight, relative to the total weight of the composition,
    wherein the composition comprises a total amount of water-soluble organic components ranging from 25% to 60% by weight, relative to the total weight of the composition.

DETAILED DESCRIPTION

Disclosed herein are inkjet ink compositions that can result in one or more improved printing parameters such as mottle, drying times, and/or strikethrough.

Mottle appears as an uneven printed image resulting from optical density variations. Mottle and strike-through performance of pigmented inkjet inks can be impacted by the mobility of the pigments in the lateral and vertical (through paper) directions. To achieve good mottle with pigmented inkjet inks (e.g., a more even printed image), an inkjet ink composition can be manipulated to have a significant increase in viscosity or to allow flocculation of particles on a substrate, resulting in pigments quickly fixing onto a substrate. One trigger for pigment flocculation is the presence of di/trivalent cations such as Ca or Mg on the paper surface. However, when an ink composition includes a polymeric dispersant and/or binder, either in soluble or dispersion form (particles), the polymers can compete with pigments to bind with di/trivalent cations on paper surface. This competitive binding from the polymer can lead to less efficient pigment fixation on the lateral plane of the paper surface, which in turn can produce mottle.

In one embodiment, it has been discovered that mottle can be improved with an inkjet ink composition or (paper) coating composition comprising, consisting essentially of, or consisting of:
  at least one pigment;
  at least one polymer; and
  at least one water-soluble compound having a hydroxyl number of at least 40, wherein the at least one water-soluble compound is selected from ethoxylated $C_3$-$C_{20}$ polyols, $C_4$-$C_{20}$ polyols having three or more hydroxyl groups, and polyether polyols, and wherein the at least one water-soluble compound is present in an amount ranging from 1% to by 60% weight, relative to the total weight of the composition,
  wherein the composition comprises a total amount of water-soluble organic components ranging from 25% to 60% by weight, relative to the total weight of the composition.

In one embodiment, the at least one water-soluble compound has a hydroxyl number of at least 40, e.g., at least 50, at least 60, at least 70, at least 80, or at least 100. Hydroxyl number is a measure of the content of free hydroxyl groups in a chemical substance, usually expressed in units of the mass of potassium hydroxide (KOH) in milligrams equivalent to the hydroxyl content of one gram of the chemical substance. Hydroxyl number can be theoretically calculated according to the following equation:

$$\text{Hydroxyl no.} = 56*1000*(\text{no. of hydroxyl groups per molecule})/\text{molecular weight}$$

The hydroxyl number can also be determined experimentally by titration with methods well known in the art.

In one embodiment, the at least one water-soluble compound is selected from ethoxylated $C_3$-$C_{20}$ polyols. Exemplary ethoxylated $C_3$-$C_{20}$ polyols include ethoxylated triols, ethoxylated tetraols, ethoxylated pentaols, and ethoxylated hexaols. In another embodiment, the ethoxylated $C_3$-$C_{20}$ polyols are selected from ethyoxylated glycerol, ethoxylated pentaerythritol, ethoxylated trimethylolpropane, ethoxylated glucoside, and ethoxylated glucose.

In one embodiment, the at least one water-soluble compound is selected from polyether polyols, e.g., polyglycerols, which can be oligomers or polymers resulting from the oligomerization of glycerol, or the polymerization of glycerol and/or glycerol-based oligomers. In one embodiment, the polyglycerols are selected from oligomers comprising at least two glycerol monomers (e.g., diglycerols), at least three glycerol monomers (e.g., triglycerols), etc. In another embodiment, polyglycerols comprise mixtures of oligomer types, e.g., the polyglycerols are selected from at least two oligomer types (or at least three oligomer types, at least four oligomer types, at least five oligomer types, etc.), where the oligomer types are differentiated by chain length and each oligomer type comprising at least two glycerol monomers, at least 3 glycerol monomers, and up to higher oligomers. For example, the polyglycerols are selected from at least two oligomers types, each oligomer type comprising 2-10 or 2-20 glycerol monomers.

In one embodiment, the at least one water-soluble compound is selected from $C_4$-$C_{20}$ polyols having three or more hydroxyl groups, e.g., $C_5$-$C_{20}$ polyols having three or more hydroxyl groups. Exemplary polyols include xylitol and sorbitol.

In one embodiment, the at least one water-soluble compound is selected from mixtures of water-soluble compounds.

In one embodiment, the at least one water-soluble compound is present in an amount ranging from 2% to 60% by weight, relative to the total weight of the composition, e.g., an amount ranging from 3% to 60%, from 5% to 60%, from 1% to 45%, from 2% to 45%, from 3% to 45%, from 5% to 45%, from 1% to 30%, from 2% to 30%, from 3% to 30%, from 5% to 30%, from 1% to 20%, from 2% to 20%, from 3% to 30%, or from 5% to 30%, by weight, relative to the total weight of the composition.

Generally, mottle and/or dry time can be more significant for inkjet ink compositions of higher viscosity when printing on coated papers, due to less penetration and/or slower evaporation. Accordingly, in one embodiment, the composition comprises a total amount of water-soluble organic components ranging from 25% to 60% by weight, relative to the total weight of the composition, e.g., a total amount ranging from 30% to 60%, from 25% to 45%, or from 30% to 45% by weight relative to the total weight of the composition.

Paper for inkjet printing generally comprises cellulose fiber, fillers, binders, and sizing agents. Uncoated papers have pores in the 1-500 micron size range. In one embodiment, the paper is a coated inkjet paper in which the paper coating can impart certain qualities to the paper, including weight, surface gloss, smoothness, and/or reduced ink absorbency. The coating can provide pores in the 5 nm to 1 μm size range. In one embodiment, the paper coatings comprise one or more of inorganic oxides (e.g., titania, silica, alumina), inorganic salts (e.g., alkali or alkaline earth metal salts such as calcium carbonate), and/or polymers (e.g., latexes).

When pigmented ink droplets are deposited onto a coated substrate, e.g., coated paper, if the pigment particles are not quickly immobilized, they will preferentially migrate to the regions where having higher evaporation rates. This can produce variations in optical density (mottle) throughout the substrate. The less stable the pigment, the quicker the immobilization on the substrate. Thus, higher immobilization rates generate improved mottle. Surfactants adds steric stabilization to pigment particles due to adsorption and hydration in the aqueous environment. Without wishing to be bound by any theory, organic compounds having an appreciable number of free hydroxyl groups (e.g., having a hydroxyl number of at least 40) can bind a large volume of water and can "dehydrate" surfactants. Upon adsorbing onto a pigment, the dehydrated surfactant tails would likely add less stability to the pigment, thereby enhancing the immobilization of pigments on a substrate.

In one embodiment, the water-soluble organic components comprises, consists essentially of, or consists of, the at least one water-soluble organic compound and at least one organic solvent. In one embodiment, the at least one solvent is chemically stable to aqueous hydrolysis conditions (e.g., reaction with water under heat aging conditions). Examples of suitable solvents include low molecular-weight glycols (such as ethylene glycol, diethylene glycol, triethylene glycol, tetraethylene glycol, dipropylene glycol, ethylene glycol monomethyl ether, ethylene glycol monoethyl ether, triethylene glycol monomethyl or monoethyl ether, diethylene glycol monomethyl ether, diethylene glycol monoethyl ether, diethylene glycol monobutyl ether, and tetraethylene glycol monobutyl ether); alcohols (such as ethanol, propanol, iso-propyl alcohol, n-butyl alcohol, sec-butyl alcohol, and tert-butyl alcohol, 2-propyn-1-ol (propargyl alcohol), 2-buten-1-ol, 3-buten-2-ol, 3-butyn-2-ol, and cyclopropanol); diols containing from about 2 to about 40 carbon atoms (such as 1,3-pentanediol, 1,4-butanediol, 1,5-pentanediol, 1,4-pentanediol, 1,6-hexanediol, 1,5-hexanediol, 2,6-hexanediol, neopentylglycol (2,2-dimethyl-1,3-propanediol), 1,3-propanediol, 1,4-butanediol, 1,5-pentanediol, 1,6-hexanediol, 1,2,6-hexanetriol, and poly(ethylene-co-propylene)glycol, as well as their reaction products with alkylene oxides, including ethylene oxides, including ethylene oxide and propylene oxide); triols containing from about 3 to about 40 carbon atoms (such as glycerine (glycerol), trimethylolethane, trimethylolpropane, 1,3,5-pentanetriol, 1,2,6-hexanetriol, and the like as well as their reaction products with alkylene oxides, including ethylene oxide, propylene oxide, and mixtures thereof); polyols (such as pentaerythritol); amides (such as dimethyl formaldehyde and dimethyl acetamide); ketones or ketoalcohols (such as acetone and diacetone alcohol); ethers (such as tetrahydrofuran and dioxane); lactams (such as 2-pyrrolidone, N-methyl-2-pyrrolidone, and ε-caprolactam); ureas or urea derivatives (such as di-(2-hydroxyethyl)-5,5-dimethyl hydantoin (dantocol) and 1,3-dimethyl-2-imidazolidinone); inner salts (such as betaine); and hydroxyamide derivatives (such as acetylethanolamine, acetylpropanolamine, propylcarboxyethanolamine, and propylcarboxy propanolamine, as well as their reaction products with alkylene oxides).

In one embodiment, the water-soluble organic components comprises, consists essentially of, or consists of, the at least one water-soluble organic compound, at least one organic solvent, and at least one surfactant. In one embodiment, the at least one surfactant is selected from nonionic surfactants. Exemplary surfactants include alkoxylated (e.g., ethoxylated) alkyne-containing alkylene diols, N-alkyl pyrrolidones, ethoxylated alkanes, alkylphenyl ethoxylates, $C_4$-$C_{20}$ alkyl alcohols, $C_5$-$C_{20}$ aryl alcohols, fluorinated-based surfactants, and silicone based surfactants. In one embodiment, the solvent is selected from glycerin (glycerol).

In one embodiment, the at least one organic solvent is present in an amount ranging from 10% to 50% by weight, relative to the total weight of the composition, e.g., an amount ranging from 20% to 50%, from 10% to 40%, or from 20% to 40% by weight.

In one embodiment, the surfactant is present in the composition in an amount ranging from 0.1% to 5% by weight, relative to the total weight of the composition, e.g., an amount ranging from 0.1% to 3%, from 0.1% to 2%, from 0.5% to 5%, from 0.5% to 3%, from 0.5% to 2%, from 1% to 5%, or from 1% to 3% by weight, relative to the total weight of the composition.

In one embodiment, the surfactant is selected from a compound having the following structure:

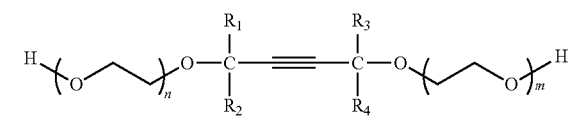

wherein $R^1$-$R^5$ are each independently selected from linear and branched $C_1$-$C_{20}$ alkyls, and n and m are independently selected from integers wherein at least one of n and m 1, e.g., n+m≥1. In another embodiment, n+m ranges from 1 to 9, e.g., from 1 to 8, from 1 to 7, from 1 to 6, from 1 to 5, from 2 to 9, from 2 to 8, from 2 to 7, from 2 to 6, or from 2 to 5. In one embodiment, $R^5$ is selected from linear and branched $C_3$-$C_{20}$ alkyls, e.g., linear and branched $C_3$-$C_{12}$ alkyls. In one embodiment, $R^1$-$R^4$ are each independently selected from linear and branched $C_1$-$C_{12}$ alkyls. Exemplary surfactants of having this formula include Surfynol® 440 and Dynol® 604, commercially available from Air Products and Chemicals, Inc.

In one embodiment, the at least one polymer is selected from polymeric dispersants and polymeric binders. In one embodiment, the at least one polymer is selected from polymeric dispersants, which in combination with the at least one pigment, would result in a polymer-dispersed pigment. In another embodiment, the polymer-dispersed pigment is a self-dispersed pigment, e.g., a polymer-encapsulated. Polymeric self-dispersed pigments can be prepared by any method known in the art, e.g., the methods described in U.S. Pat. No. 8,492,457, the disclosure of which is incorporated herein by reference.

The polymeric dispersant can be a natural polymer or a synthetic polymer dispersant. Specific examples of natural polymer dispersants include proteins such as glue, gelatin, casein and albumin; natural rubbers such as gum arabic and tragacanth gum; glucosides such as saponin; alginic acid, and alginic acid derivatives such as propyleneglycol alginate, triethanolamine alginate, and ammonium alginate; and cellulose derivatives such as methyl cellulose, carboxymethyl cellulose, hydroxyethyl cellulose and ethylhydroxy cellulose. Specific examples of polymeric dispersants, including synthetic polymeric dispersants, include polyvinyl alcohols, polyvinylpyrrolidones, acrylic or methacrylic resins (often written as "(meth)acrylic") such as poly(meth)acrylic acid, acrylic acid-(meth)acrylonitrile copolymers, potassium (meth)acrylate-(meth)acrylonitrile copolymers, vinyl acetate-(meth)acrylate ester copolymers and (meth)acrylic acid-(meth)acrylate ester copolymers; styrene-acrylic or methacrylic resins such as styrene-(meth)acrylic acid copolymers, styrene-(meth)acrylic acid-(meth)acrylate ester copolymers, styrene-α-methylstyrene-(meth)acrylic acid copolymers, styrene-α-methylstyrene-(meth)acrylic acid-(meth)acrylate ester copolymers; styrene-maleic acid copolymers; styrene-maleic anhydride copolymers, vinyl naphthalene-acrylic or methacrylic acid copolymers; vinyl naphthalene-maleic acid copolymers; and vinyl acetate copolymers such as vinyl acetate-ethylene copolymer, vinyl acetate-fatty acid vinyl ethylene copolymers, vinyl acetate-maleate ester copolymers, vinyl acetate-crotonic acid copolymer and vinyl acetate-acrylic acid copolymer; hybrid polyurethane acrylates; waxes, polyesters; polystyrene butadienes; poly(meth)acrylamides; and salts thereof.

In one embodiment, the at least one polymer is selected from polyurethanes, styrene-acrylic copolymers, styrene-methacrylic copolymers, styrene-maleic anhydride copolymers, hybrid polyurethane acrylates, waxes, polyesters, polystyrene butadienes, alginates, gelatins, polyacrylamides, and polymethacrylamides.

With the increasing need for versatile custom-scale commercial printings, inkjet-based technologies have displayed advantages over technologies such as offset technology due to their flexibility and lower cost. Commercial printing (or high speed printing) includes transactional, book printing (trade books, educational books, etc.), direct mail, and magazine printing. Commercial printing differs from desktop/office printing in terms of speed, reliability and print quality. High speed inkjet printing can be either sheet fed or web fed. Web press inkjet printing is a commercial printing technology developed to print on a continuous paper web at rates of hundreds of feet per minute. (In contrast, the rate of desktop printing is generally less than 50 pages per minute for black only.) In one embodiment, the high speed printing is performed at a rate of at least 100 ft./min for four color printing. The firing frequency for high speed printing can be at least 15 kHz. (Desktop printing firing frequencies are typically less than 15 kHz due to the lower print speeds.)

Pigments

Pigments are solid materials, generally in the form of a particulate or in a form readily formed into a particulate, such as a pressed cake. The pigment can be any type of pigment conventionally used by those skilled in the art, such as black pigments and other colored pigments including blue, black, brown, cyan, green, white, violet, magenta, red, orange, or yellow pigments. Mixtures of different pigments can also be used. Representative examples of black pigments include various carbon blacks (Pigment Black 7) such as channel blacks, furnace blacks, gas blacks, and lamp blacks, and include, for example, carbon blacks sold as Regal®, Black Pearls®, Elftex®, Monarch®, Mogul®, and Vulcan® carbon blacks available from Cabot Corporation (such as Black Pearls® 2000, Black Pearls® 1400, Black Pearls® 1300, Black Pearls® 1100, Black Pearls® 1000, Black Pearls® 900, Black Pearls® 880, Black Pearls® 800, Black Pearls® 700, Black Pearls® 570, Black Pearls® L, Elftex® 8, Monarch® 1400, Monarch® 1300, Monarch® 1100, Monarch® 1000, Monarch® 900, Monarch® 880, Monarch® 800, Monarch® 700, Regal® 660, Mogul® L, Regal® 330, Regal® 400, Vulcan® P). Carbon blacks available from other suppliers can be used. Suitable classes of colored pigments include, for example, anthraquinones, phthalocyanine blues, phthalocyanine greens, diazos, monoazos, pyranthrones, perylenes, heterocyclic yellows, quinacridones, quinolonoquinolones, and (thio)indigoids. Such pigments are commercially available in either powder or press cake form from a number of sources including, BASF Corporation, Engelhard Corporation, Sun Chemical Corporation, Clariant, and Dianippon Ink and Chemicals (DIC). In one embodiment, the pigment has no primary amines.

Examples of phthalocyanine blues include copper phthalocyanine blue and derivatives thereof (Pigment Blue 15). Examples of quinacridones include Pigment Orange 48, Pigment Orange 49, Pigment Red 122, Pigment Red 192, Pigment Red 202, Pigment Red 206, Pigment Red 207, Pigment Red 209, Pigment Violet 19 and Pigment Violet 42. Examples of anthraquinones include Pigment Red 43, Pigment Red 194 (Perinone Red), Pigment Red 216 (Brominated Pyrathrone Red) and Pigment Red 226 (Pyranthrone Red). Examples of perylenes include Pigment Red 123 (Vermillion), Pigment Red 149 (Scarlet), Pigment Red 179 (Maroon), Pigment Red 190 (Red), Pigment Violet, Pigment Red 189 (Yellow Shade Red) and Pigment Red 224. Examples of thioindigoids include Pigment Red 86, Pigment Red 87, Pigment Red 88, Pigment Red 181, Pigment Red 198, Pigment Violet 36, and Pigment Violet 38. Examples of heterocyclic yellow include Pigment Yellow 117 and Pigment Yellow 138. Other suitable examples of pigments include yellow pigments such as Pigment Yellow 1, 74, 128, 139, 155, 180, 185, 213, 218, 220, and 221, red pigments such as Pigment Red 177, 185, 254, and 269, blue pigments such as Pigment Blue 16 and 60, orange pigments such as Pigment Orange 168, and green pigments such as Pigment Green 7 and 36. Examples of other suitable colored pigments are described in Colour Index, 3rd edition (The Society of Dyers and Cikiyrusts, 1982).

The pigments may further incorporate additional dyes to modify color balance and adjust optical density. Such dyes include food dyes, FD&C dyes, acid dyes, direct dyes, reactive dyes, derivatives of phthalocyanine sulfonic acids, including copper phthalocyanine derivatives, sodium salts, ammonium salts, potassium salts, and lithium salts.

In one embodiment, the pigment is a self-dispersed pigment. In one embodiment, the self-dispersed pigments have attached at least one organic group. Such self-dispersed pigments can be prepared by modifying any of the pigments disclosed herein with at least one organic group.

In one embodiment, an "attached" organic group can be distinguished from an adsorbed group in that a soxhlet extraction for several hours (e.g., at least 4, 6, 8, 12, or 24 hours) will not remove the attached group from the pigment. In another embodiment, the organic group is attached to the pigment if the organic group cannot be removed after repeated washing with a solvent or solvent mixture that can dissolve the starting organic treating material but cannot disperse the treated pigment. In yet another embodiment, "attached" refers to a bond such as a covalent bond, e.g., a pigment bonded or covalently bonded to a nucleophile or organic group.

The organic group may be an aliphatic group, a cyclic organic group, or an organic compound having an aliphatic portion and a cyclic portion. In one embodiment, the organic group is attached via a diazonium salt derived from a primary amine capable of forming, even transiently, a diazonium salt. Other methods of attachment are described below. The organic group may be substituted or unsubstituted, branched or unbranched. Aliphatic groups include, for example, groups derived from alkanes, alkenes, alcohols, ethers, aldehydes, ketones, carboxylic acids, and carbohydrates. Cyclic organic groups include, but are not limited to, alicyclic hydrocarbon groups (for example, cycloalkyls, cycloalkenyls), heterocyclic hydrocarbon groups (for example, pyrrolidinyl, pyrrolinyl, piperidinyl, morpholinyl, and the like), aryl groups (for example, phenyl, naphthyl, anthracenyl), and heteroaryl groups (imidazolyl, pyrazolyl, pyridinyl, thienyl, thiazolyl, furyl, indolyl, and triazolyl, such as 1,2,4-triazolyl and 1,2,3-triazolyl).

In one embodiment, the at least one attached organic group comprises at least one ionic group, ionizable group, or mixtures of an ionic group and an ionizable group. An ionic group can be either anionic or cationic and can be associated with a counterion of the opposite charge including inorganic or organic counterions, such as $Na^+$, $K^+$, $Li^+$, $NH_4^+$, $NR'_4^+$, acetate, $NO_3^-$, $SO_4^{2-}$, $R'SO_3^-$, $R'OSO_3^-$, $OH^-$, or $Cl^-$, where R' represents hydrogen or an organic group, such as a substituted or unsubstituted aryl or alkyl group. An ionizable group is one that is capable of forming an ionic group in the medium of use. Anionic groups are negatively charged ionic groups that can be generated from groups having ionizable substituents that can form anions (anionizable groups), such as acidic substituents. Cationic groups are positively charged organic ionic groups that can be generated from ionizable substituents that can form cations (cationizable groups), such as protonated amines. Specific examples of anionic groups include —$COO^-$, —$SO_3^-$, —$OSO_3^-$, —$HPO_3^-$; —$OPO_3^{2-}$, or —$PO_3^{2-}$, and specific examples of an anionizable group can include —COOH, —$SO_3H$, —$PO_3H_2$, —R'SH, or —R'OH, where R' represents hydrogen or an organic group, such as a substituted or unsubstituted aryl or alkyl group. Also, specific examples of cationic or cationizable groups include alkyl or aryl amines, which can be protonated in acidic media to form ammonium groups —$NR'_2H^+$, where R' represent an organic group, such as a substituted or unsubstituted aryl or alkyl groups. Organic ionic groups include those described in U.S. Pat. No. 5,698,016, the disclosure of which is incorporated herein by reference.

For example, the attached group may be an organic group such as a benzene carboxylic acid group (—$C_6H_4$—COOH group), a benzene dicarboxylic acid group, a benzene tricarboxylic acid group, a benzene sulfonic acid group (a —$C_6H_4$—$SO_3H$ group), or salts thereof. In one embodiment, surface modification to introduce ionic or ionizable groups onto a pigment surface, such as chlorination and sulfonylation, may also be used.

In one embodiment, the carbon black is modified with at least one organic group via a diazonium treatment as detailed, for instance, in the following patents: U.S. Pat. Nos. 5,554,739; 5,630,868; 5,672,198; 5,707,432; 5,851, 280; 5,885,335; 5,895,522; 5,900,029; 5,922,118; 6,042, 643; 6,534,569; 6,398,858 and 6,494,943 (high shear conditions) 6,372,820; 6,368,239; 6,350,519; 6,337,358; 6,103, 380; 7,173,078; 7,056,962; 6,942,724; 6,929,889; 6,911, 073; 6,478,863; 6,472,471; and WO 2011/143533, the disclosures of which are incorporated herein by reference. In one embodiment, the attachment is provided via a diazonium reaction where the at least one organic group has a diazonium salt substituent. In another embodiment, the direct attachment can be formed by using the diazonium and stable free radical methods described, for instance, in U.S. Pat. Nos. 6,068,688; 6,337,358; 6,368,239; 6,551,393; 6,852,158, the disclosures of which are incorporated herein by reference, which makes use of reacting at least one radical with at least one particle, wherein a radical is generated from the interaction of at least one transition metal compound with at least one organo-halide compound in the presence of one or more particles capable of radical capture, and the like. In one embodiment, the organic group is derived from amino-functionalized aromatic compounds, such as 4-aminobenzyl amine (4-ABA), 3-aminobenzyl amine (3-ABA), 2-aminobenzyl amine (2-ABA), 2-aminophenyl ethylamine, 4-aminophenyl-(2-sulfatoethyl)-sulphone, (APSES), p-aminobenzoic acid (PABA), 4-aminophthalic acid (4-APA), and 5-aminobenzene-1,2,3-tricarboxylic acid.

In one embodiment, the at least one organic group is capable of binding calcium (e.g., having defined calcium index values), including those organic groups described in PCT Pub. No. WO 2007/053564, the disclosure of which is incorporated herein by reference. For example, the organic group comprises at least one geminal bisphosphonic acid group, partial esters thereof, or salts thereof, e.g., a group having the formula —$CQ(PO_3H_2)_2$, partial esters thereof, or salts thereof, wherein Q is bonded to the geminal position and may be H, R, OR, SR, or $NR_2$ wherein R", which can be the same or different, is defined as above, or can be H, a $C_1$-$C_{18}$ saturated or unsaturated, branched or unbranched alkyl group, a $C_1$-$C_{18}$ saturated or unsaturated, branched or unbranched acyl group, an aralkyl group, an alkaryl group, or an aryl group. In addition, U.S. Pat. Nos. 5,672,198, 5,922,118, 6,042,643, and 6,641,656 disclose modified pigments having various attached groups, including phosphonic acid groups, the disclosures of which are incorporated herein by reference.

In yet another embodiment, the at least one carbon black can be modified (e.g., to attach functional groups) by using the methods of U.S. Pat. Nos. 5,837,045, 6,660,075 and WO 2009/048564 (reaction with organic compounds containing a C—C double bond or triple bond activated by at least one substituent) or U.S. Pub. No. 2004/0171725, U.S. Pat. Nos.

6,664,312, 6,831,194 (reaction with anhydride component), U.S. Pat. No. 6,936,097, U.S. Pub. Nos. 2001/0036994, 2003/0101901 (reaction with organic groups having —N═N—N— group), Canadian Patent No. 2,351,162, European Patent No. 1 394 221, and PCT Publication Nos. WO 01/51566 (reaction between at least one electrophile and at least one nucleophile), WO 04/63289, WO 2010/141071 (reaction with H2N-A-Y where A is a heteroatom), and WO 99/23174, the disclosures of which are incorporated herein by reference. Further examples of representative organic groups are described in U.S. Pat. Nos. 5,571,311; 5,630,868; 5,707,432, 5,955,232; 5,922,118; 5,900,029; 5,895,522; 5,885,335; 5,851,280; 5,837,045; 5,713,988; and 5,803,959; PCT Publication No. WO 96/18688; and PCT Publication No. WO 96/18690, the disclosures of which are incorporated herein by reference.

The amount of attached organic groups can be varied, depending on the desired use of the modified carbon black and the type of attached group. For example, the total amount of organic group may be from about 0.01 to about 10.0 micromoles of groups/$m^2$ surface area of pigment, as measured by nitrogen adsorption (BET method), including from about 0.5 to about 5.0 micromoles/$m^2$, from about 1 to about 3 micromoles/$m^2$, or from about 2 to about 2.5 micromoles/$m^2$.

In one embodiment, the dispersion can be formulated to provide an amount of pigment such that the final amount in the inkjet ink composition is effective to provide the desired image quality (for example, optical density) without detrimentally affecting the performance of the inkjet ink. In one embodiment, the pigment is present in an amount ranging from 1% to 10% by weight, relative to the total weight of the composition, e.g., an amount ranging from 2% to 10% by weight, from 3% to 10% by weight, from 2% to 7% by weight, or from 3% to 7% by weight, relative to the total weight of the composition.

Additives

In one embodiment, in addition to the surfactant, the inkjet ink compositions can further comprise one or more suitable additives to impart a number of desired properties while maintaining the stability of the compositions. Other additives are well known in the art and include humectants, biocides and fungicides, pH control agents, drying accelerators, penetrants, and the like. The amount of a particular additive will vary depending on a variety of factors but are generally present in an amount ranging between 0.01% and 40% based on the weight of the inkjet ink composition. In one embodiment, the at least one additive is present in in an amount ranging from 0.05% to 5%, e.g., an amount ranging from 0.1% to 5%, or an amount ranging from 0.5% to 2%, by weight relative to the total weight of the inkjet ink composition Humectants other than the at least one organic solvent may also be added to the inkjet ink composition, e.g., for the purpose of preventing clogging of the nozzle as well as for providing paper penetration (penetrants), improved drying (drying accelerators), and anti-cockling properties. In one embodiment, the humectant and/or water-soluble compound is present in an amount ranging from 0.1% to 10%, e.g., an amount ranging from 1% to 10%, or an amount ranging from 0.1% to 5%, or from 1% to 5%.

Biocides and/or fungicides may also be added to the aqueous dispersions or inkjet ink composition disclosed herein. Biocides are important in preventing bacterial growth since bacteria are often larger than ink nozzles and can cause clogging as well as other printing problems. Examples of useful biocides include, but are not limited to, benzoate or sorbate salts, and isothiazolinones. In one embodiment, the biocides and/or fungicides are present in an amount ranging from 0.05% to 5% by weight, 0.05% to 2% by weight, 0.1% to 5% by weight, or 0.1% to 2% by weight, relative to the total weight of the composition.

EXAMPLES

Example 1

This Example describes the preparation of aqueous inkjet ink compositions.

Table 1 lists the pigments and polymers used in the inkjet ink compositions and the final ink concentrations. The pigments used were a cyan pigment having attached an organic group ("PB 15:5 modified"), prepared in a manner similar to that of Example 72 in U.S. Pub. No. 2007/0100024, and a polymer-encapsulated cyan pigment ("PB 15:4 encapsulated"), prepared according to the method of Example 3 of U.S. Pat. No. 8,492,457, the disclosures of which are incorporated herein by reference. The polymers used were NeoRez® R-551 ("R551"), commercially available from DSM, and a styrene acrylic acid copolymer having an acid number of 160 ("SA"), commercially available from BASF.

TABLE 1

| Inks | Pigment | Polymer |
|---|---|---|
| Ink-1 | PB 15:4 modified (2.5 wt %) | R-551 (4.8%) and SA (1.5%*) |
| Ink-2 | PB 15:4 modified (2.5 wt %) | R-551 (4.8%) |
| Ink-3 | PB 15:4 modified (2.5 wt %) | R-551 (4.8%) and SA (1.5%*) |
| Ink-4 | PB 15:4 encapsulated (2.5 wt %) | R-551 (4.8%) and SA (1.5%*) |

*neutralized by KOH
** contains free polymer (~0.3% in the ink)

Table 2 lists the remainder of the ink components. Surfynol® 440 surfactant is available from Air Products and Chemicals, Inc. Proxel® GXL antimicrobial is available from Lonza Group Ltd. The glycerin content was adjusted to achieve a final ink viscosity ranging from 6.0 to 7.0 cP at 25° C. (Brookfield viscosity, #18 spindle @ 150 rpm).

TABLE 2

| Component | wt % |
|---|---|
| Surfynol ® 440 | 0.80 |
| ethoxylated glycerol | 9 (0% for comparative samples) |
| glycerine | 20-40 |
| Proxel ® GXL | 0.1 |
| DI Water | Balance |

Comparative inks C-Ink-1 to C-Ink-4 were also prepared in the same manner minus the ethoxylated glycerol.

Example 2

This Example describes test results of inkjet ink compositions Ink-1 to Ink-4 as compared with the comparative inks C-Ink-1 to C-Ink-4.

Drawdowns were performed on paper substrates using wire wound rod #18. 70 μL of ink was pipetted on inkjet-coated papers from Appleton Utopia.

Mottle was visually evaluated and ranked from best (1) to worst (7). To test for durability, the drawdown samples were subjected to a dry smear test at 5 s intervals. Smear tests were performed with Kimwipes® folded to the squares. Strikethrough performance was evaluated visually. The test results are shown in Table 3.

TABLE 3

| Ink Composition | Mottle |
|---|---|
| Ink-1 | 5 |
| C-Ink-1 | 6 |
| Ink-2 | 2 |
| C-Ink-2 | 4 |
| Ink-3 | 3 |
| C-Ink-3 | 7 |
| Ink-4 | 1 |
| C-Ink-4 | 3 |

From Table 3, it can be seen that each of inkjet ink compositions Ink-1 to Ink-4 show improved mottle compared to the respective comparative inks C-Ink-1 to C-Ink-4. Additionally, each of inks Ink-1 to Ink-4 showed improved dry time and strikethrough in relation to the comparative counterparts C-Ink-1 to C-Ink-4. This improvement can be attributed to the presence of the at least one water-soluble compound and a total amount of water-soluble organic components of at least 25% by weight.

Example 3

This Example describes the preparation of aqueous inkjet ink compositions containing various water-soluble compounds.

Table 4 lists the components of inkjet ink compositions Ink-5 to Ink-9. These ink compositions were compared to a composition free of a water-soluble compound, as claimed ("C-ink-A"). Comparative C-Ink-A contained a total amount of water-soluble organic components of at least 25% by weight. PB 15:4 encapsulated and R551 are described in Example 1. Two different polyglycerols are tested: Polyglycerol –4 (Solvay) and Polyglycerol 750 (Sakamoto Yakuhin Kogyo). Glucam™ E-20 humectant (methyl gluceth-20) is an ethoxylated methyl glycose available from The Lubrizol Corporation.

TABLE 4

| Ink Ingredients | Ink-5 | Ink-6 | Ink-7 | Ink-8 | Ink-9 | C-Ink-A |
|---|---|---|---|---|---|---|
| PB 15:4 encapsulated | 2.5 | 2.5 | 2.5 | 2.5 | 2.5 | 2.5 |
| R551 | 4.8 | 4.8 | 4.8 | 4.8 | 4.8 | 4.8 |
| Surfynol ® 440 | 1.0 | 1.0 | 1.0 | 1.0 | 1.0 | 1.0 |
| Polyglycerol 750 | 9.0 | | | | | |
| Polyglycerol-4 | | 9.0 | | | | |
| Pentaerythitol ethoxylate | | | 7.0 | | | |
| Glucam E20 | | | | 7 | | |
| xylitol | | | | | 42 | |
| glycerol | 26.5 | 26.5 | 26.3 | 26.3 | 0 | 38 |
| water | balance | balance | balance | balance | balance | balance |

Each of the ink compositions "Ink-5 to Ink-9" demonstrated improved mottle, dry time, and strikethrough compared to Comp-ink-A. Thus, it can be seen that the use of the claimed water-soluble compounds in combination with a total amount of water-soluble organic components of at least 25% by weight, is beneficial to printing performance.

The use of the terms "a" and "an" and "the" are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

The invention claimed is:

1. An aqueous inkjet ink composition comprising:
   at least one pigment, wherein the at least one pigment is a self-dispersed pigment;
   at least one polymer selected from polyurethanes; and
   at least one water-soluble compound having a hydroxyl number of at least 40, wherein the at least one water-soluble compound is selected from ethoxylated $C_3$-$C_{20}$ polyols, $C_4$-$C_{20}$ polyols having three or more hydroxyl groups selected from xylitol and sorbitol, and polyether polyols, and wherein the at least one water-soluble compound is present in an amount ranging from 1% to by 60% weight, relative to the total weight of the composition,
   wherein the composition comprises a total amount of water-soluble organic components ranging from 25% to 60% by weight, relative to the total weight of the composition.

2. The composition of claim 1, wherein the at least one water-soluble compound is selected from ethoxylated $C_3$-$C_{20}$ polyols.

3. The composition of claim 2, wherein the ethoxylated $C_3$-$C_{20}$ polyols are selected from ethoxylated triols, ethoxylated tetraols, ethoxylated pentaols, and ethoxylated hexaols.

4. The composition of claim 2, wherein the ethoxylated $C_3$-$C_{20}$ polyols are selected from ethyoxylated glycerol, ethoxylated pentaerythritol, ethoxylated trimethylolpropane, ethoxylated glucoside, and ethoxylated glucose.

5. The composition of claim 1, wherein the at least one water-soluble compound is selected from polyether polyols.

6. The composition of claim 5, herein the polyether polyols are selected from polyglycerols.

7. The composition of claim 6, wherein the polyglycerols are selected from at least two oligomer types, each oligomer type comprising at least two glycerol monomers.

8. The composition of claim 1, wherein the at least one water-soluble compound is present in an amount ranging from 1% to 45% by weight.

9. The composition of claim 1, wherein the at least one water-soluble compound is present in an amount ranging from 2% to 45% by weight.

10. The composition of claim 1, wherein the composition comprises a total amount of water-soluble organic components ranging from 30% to 60% by weight, relative to the total weight of the composition.

11. The composition of claim 1, wherein the composition comprises glycerol.

12. The composition of claim 1, wherein the polyurethanes are selected from polymeric dispersants and polymeric binders.

13. The composition of claim 1, wherein the polyurethanes are selected from polymeric dispersants.

14. The composition of claim 1, wherein the water-soluble organic components comprises the at least one water-soluble organic compound and at least one organic solvent.

15. The composition of claim 1, wherein the water-soluble organic components comprises the at least one water-soluble organic compound, at least one organic solvent, and at least one surfactant.

16. The composition of claim 15, wherein the at least one surfactant is selected from alkoxylated alkyne-containing alkylene diols, N-alkyl pyrrolidones, ethoxylated alkanes, alkylphenyl ethoxylates, $C_4$-$C_{20}$ alkyl alcohols, $C_5$-$C_{20}$ aryl alcohols, fluorinated-based surfactants, and silicone based surfactants.

17. The composition of claim 1, wherein the self-dispersed pigment comprises a pigment having attached at least one organic group.

18. The composition of claim 1, wherein self-dispersed pigment is a polymer-encapsulated pigment.

19. A coating composition, comprising:
at least one pigment, wherein the at least one pigment is a self-dispersed pigment;
at least one polymer selected from polyurethanes; and
at least one water-soluble compound having a hydroxyl number of at least 40, wherein the at least one water-soluble compound is selected from ethoxylated $C_3$-$C_{20}$ polyols, $C_4$-$C_{20}$ polyols having three or more hydroxyl groups selected from xylitol and sorbitol, and wherein the at least one water-soluble compound is present in an amount ranging from 1% to by 60% weight, relative to the total weight of the composition,
wherein the composition comprises a total amount of water-soluble organic components ranging from 25% to 60% by weight, relative to the total weight of the composition.

20. The composition of claim 19, wherein the self-dispersed pigment comprises a pigment having attached at least one organic group.

21. The composition of claim 19, wherein self-dispersed pigment is a polymer-encapsulated pigment.

22. A method of inkjet ink printing, comprising:
depositing onto a coated inkjet paper an aqueous inkjet ink composition comprising:
at least one pigment, wherein the at least one pigment is a self-dispersed pigment;
at least one polymer selected from polyurethanes; and
at least one water-soluble compound having a hydroxyl number of at least 40, wherein the at least one water-soluble compound is selected from ethoxylated $C_3$-$C_{20}$ polyols, $C_4$-$C_{20}$ polyols having three or more hydroxyl groups selected from xylitol and sorbitol, and polyether polyols, and wherein the at least one water-soluble compound is present in an amount ranging from 1% to by 60% weight, relative to the total weight of the composition,
wherein the composition comprises a total amount of water-soluble organic components ranging from 25% to 60% by weight, relative to the total weight of the composition.

23. The composition of claim 22, wherein the self-dispersed pigment comprises a pigment having attached at least one organic group.

24. The composition of claim 22, wherein self-dispersed pigment is a polymer-encapsulated pigment.

* * * * *